United States Patent
Peng et al.

(10) Patent No.: US 12,261,540 B2
(45) Date of Patent: Mar. 25, 2025

(54) DUAL MODE CHARGE CONTROL METHOD

(71) Applicant: DELTA ELECTRONICS, INC., Taoyuan (TW)

(72) Inventors: Bo-Ruei Peng, Taoyuan (TW); Chang-Chung Lin, Taoyuan (TW); Yu-Jen Lin, Taoyuan (TW); Chia-Hsiong Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 287 days.

(21) Appl. No.: 18/156,911

(22) Filed: Jan. 19, 2023

(65) Prior Publication Data
US 2024/0113636 A1    Apr. 4, 2024

(30) Foreign Application Priority Data
Sep. 29, 2022    (CN) .......................... 202211203502.5

(51) Int. Cl.
*H02M 3/335* (2006.01)
*H02M 1/00* (2006.01)
*H02M 3/00* (2006.01)

(52) U.S. Cl.
CPC ..... *H02M 3/33592* (2013.01); *H02M 1/0009* (2021.05); *H02M 3/01* (2021.05)

(58) Field of Classification Search
CPC .. H02M 3/33592; H02M 1/0009; H02M 3/01; H02M 1/0032; H02M 3/33571
See application file for complete search history.

(56) References Cited

U.S. PATENT DOCUMENTS 10,277,140 B2    4/2019    Jia et al.
2008/0298095 A1*    12/2008    Chuang ............. H02M 3/33523
                                                                363/21.12
(Continued)

FOREIGN PATENT DOCUMENTS

CN    101707440 A    5/2010
CN    102130581 A    7/2011
(Continued)

OTHER PUBLICATIONS

Search Report dated Aug. 24, 2023 of the corresponding PCT patent application No. PCT/CN2023/099861.
(Continued)

*Primary Examiner* — Kyle J Moody
(74) *Attorney, Agent, or Firm* — MUNCY, GEISSLER, OLDS & LOWE, P.C.

(57) ABSTRACT

A dual mode charge control method includes steps of: detecting an input voltage of the resonance tank, a resonance current of the resonance tank, an output current of the load, and an output voltage of the load; performing a single-band charge control when determining a light-load condition or a no-load condition of the load according to the output current; compensating the output voltage to generate an upper threshold voltage in the single-band charge control, and acquiring a resonance voltage by calculating the resonance current by a resettable integrator; comparing the resonance voltage and the upper threshold voltage to generate a first control signal; generating a second control signal complementary to the first control signal by a pulse-width modulation duplicator; providing the first control signal and the second control signal to respectively control a first power switch and a second power switch of the resonance circuit.

11 Claims, 8 Drawing Sheets

(56) References Cited

U.S. PATENT DOCUMENTS

| | | | |
|---|---|---|---|
| 2018/0309373 A1* | 10/2018 | Chang | H02M 3/01 |
| 2018/0342957 A1 | 11/2018 | Bianco et al. | |
| 2020/0287471 A1* | 9/2020 | Huang | H02M 3/33561 |
| 2022/0103082 A1 | 3/2022 | Yang et al. | |
| 2022/0140741 A1 | 5/2022 | Lin et al. | |
| 2022/0247325 A1 | 8/2022 | Willaert et al. | |

FOREIGN PATENT DOCUMENTS

| | | |
|---|---|---|
| CN | 103326587 A | 9/2013 |
| CN | 103326587 B | 9/2015 |
| CN | 112600432 A | 4/2021 |
| CN | 114362533 A | 4/2022 |
| CN | 114362544 A | 4/2022 |
| JP | 2022531634 A | 7/2022 |
| TW | 202220356 A | 5/2022 |

OTHER PUBLICATIONS

Office Action dated Oct. 11, 2023 of the corresponding Taiwan patent application No. 111136933.

* cited by examiner

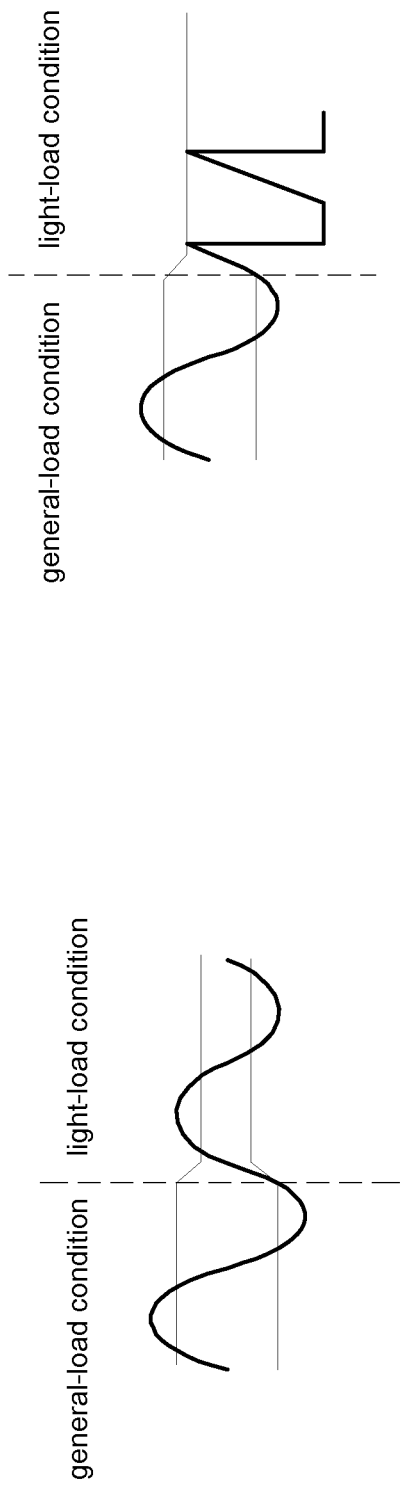

DUAL MODE CHARGE CONTROL METHOD

BACKGROUND

Technical Field

The present disclosure relates to a charge control method, and more particularly to a dual mode charge control method.

Description of Related Art

The statements in this section merely provide background information related to the present disclosure and do not necessarily constitute prior art.

The main power structure of a traditional series resonance converter (LLC converter) includes a switch network, an LC series resonance tank, a rectifier, and a control structure includes a feedback voltage and feedback current sensor, a compensator, a pulse-width modulation (PWM) generator, and a gate drive circuit (gate driver). The traditional series resonance circuit converter has advantages of zero voltage switching, low EMI noise, and wide operation frequency. However, the traditional series resonance circuit converter has disadvantages of poor dynamic response due to difficult compensation, low low-frequency DC voltage gain, and inability to suppress low-frequency ripples.

Please refer to FIG. 1, which shows a schematic waveform of a conventional charge control method. FIG. 1 shows a control manner of bang-bang charge control (BBCC). The BBCC control manner is also called a hysteretic charge control manner, which aims to improve the dynamic response speed and low-frequency DC voltage gain of the traditional LLC. The technical means of the BBCC manner are: generating two limit lines by feeding back the relationship between the output voltage compensation control and the input voltage, and comparing the generated two limit lines with the sensed resonance voltage, and then controlling power switches. As shown in FIG. 1, the upper limit line (i.e., one of the two limit lines) is generated by calculation results of the output voltage compensation, and the lower limit line (i.e., the other of the two limit lines) is designed to be generated by subtracting the upper limit line value from the input voltage sensed. Therefore, positions of the two limit lines are calculated to know the current output power through the distance between the two limit lines. For example, when the two limit lines are close to each other, the output power is lower (under a light-load condition), and vice versa when the two limit lines are far away from each other, the output power is higher (under a heavy-load condition).

However, the problems with the BBCC control manner are: when the load is light or there is no load, the two limit lines will be very close to each other or even exchanged. In addition, the feedback signal noise, interference, or the error of the voltage divider resistance, etc., make the circuit unstable or the control signal oscillate. This phenomenon is also called sub-harmonic oscillation. Although this manner adds a mono-stable flip-flop to avoid entering the SR control error zone when the two limit lines are exchanged (referring to the situation that the SR flip-flop cannot simultaneously accept the high-level input of the S end/pin and the R end/pin), under rapid load changes, the mono-stable trigger may not be properly triggered, resulting in the above-mentioned control instability and oscillation.

The purpose of the hybrid hysteresis control manner shown in FIG. 1 is to increase the efficiency and stability of the BBCC control manner under light-load condition or no-load condition. The technical means of the hybrid hysteresis control manner are: generating two limit lines by calculation results of feeding back the output voltage compensation and its compensation values, and comparing the two generated limit lines with the resonance voltage divided by the capacitor by using a capacitive voltage divider circuit, two precision current sources, and a differential comparator so as to control power switches. The current load condition can also be acquired through the distance between the two limit lines. The hybrid hysteresis control manner limits the output of the compensator to be greater than a center value of the resonance voltage so that the two limit lines do not exchange results, and the mono-stable trigger can be discarded to increase the control stability. In addition, the two precision current sources are added to provide slope compensation to increase the stability of the circuit. However, adding a slope compensation circuit will reduce the control frequency of the circuit so the advantages of the charge control manner cannot be fully utilized. Therefore, the hybrid hysteresis control manner greatly reduces control resolution and not suitable for controlling the larger wattage output.

To sum up, both the BBCC control manner and the hybrid hysteresis control manner use the resonance circuit sensing method for voltage sensing, and both control using two limited lines under light-load condition and no-load condition, and the sensing circuits do not need to be isolated. In addition, the BBCC control manner requires the use of a mono-stable trigger, while the hybrid hysteresis control manner does not require the use of a mono-stable trigger. Moreover, in terms of control complexity, the BBCC control manner is lower, and the hybrid hysteresis control manner is higher than the BBCC control manner.

SUMMARY

An objective of the present disclosure is to provide a dual mode charge control method to solve the problems of existing technology.

In order to achieve the above-mentioned objective, the dual mode charge control method is configured for controlling an output voltage of a load coupled to a circuit with a resonance tank. The method includes steps of: detecting an input voltage of the resonance tank, a resonance current of the resonance tank, an output current of the load, and an output voltage of the load; performing a single-band charge control when determining a light-load condition or a no-load condition of the load according to the output current; compensating the output voltage to generate an upper threshold voltage in the single-band charge control, and acquiring a resonance voltage by calculating the resonance current by a resettable integrator; comparing the resonance voltage and the upper threshold voltage to generate a first control signal, wherein when the resonance voltage is greater than or equal to the upper threshold voltage, the resettable integrator is reset; generating a second control signal complementary to the first control signal by a pulse-width modulation duplicator; providing the first control signal and the second control signal to respectively control a first power switch and a second power switch of the resonance circuit.

In one embodiment, when determining a heavy-load condition or a general-load condition according to the output current, the single-band charge control is switched to a dual-band charge control.

In one embodiment, when the resonance voltage is increased to reach the upper threshold voltage, the resettable integrator is reset, and an on-time length of the first control signal is acquired.

In one embodiment, the resettable integrator is reset by a control signal generated by a pulse-width modulation generator to zero an integral value the resonance current sensed in isolation.

In one embodiment, the output voltage is compensated by voltage and slope.

In one embodiment, the resonance current is sensed by an isolated current transformer connected to the resettable integrator in series.

In one embodiment, in the same cycle, the on-time length of the first power switch is the same as an on-time length of the second power switch; an off-time length of the first power switch is the same as an off-time length of the second power switch.

In one embodiment, in the dual-band charge control, further includes steps of: compensating the input voltage to generate a lower threshold voltage by subtracting the upper threshold voltage from results of sensing the input voltage; comparing sensed resonance voltage in isolation with the upper threshold voltage and the lower threshold voltage to generate the first control signal and the second control signal, and providing the first control signal and the second control signal to respectively control the first power switch and the second power switch of the resonance circuit.

In one embodiment, control signals of controlling the first power switch and the second power switch and a signal related to a resonance frequency of the resonance tank perform a union operation to control bridge arm switches of synchronous rectification.

In one embodiment, the resonance current is calculated by the resettable integrator and a current transformer connected in series to acquire the resonance voltage in isolation.

In one embodiment, when the resonance voltage is greater than or equal to the upper threshold voltage, the resettable integrator is reset, and the on-time length of the first control signal is recorded.

Accordingly, based on the dual-band charge control method, the single-band charge control method is added to implement the dual-mode control method, thereby increasing the stability of the resonance circuit under the light-loading condition or the no-loading condition, and the single-band charge control and the dual-band charge control can be freely switched according to the load conditions.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows:

FIG. 1 is a schematic waveform of a conventional charge control method.

FIG. 2 is a schematic waveform of a dual mode charge control method according to the present disclosure.

DETAILED DESCRIPTION

Figure 3:
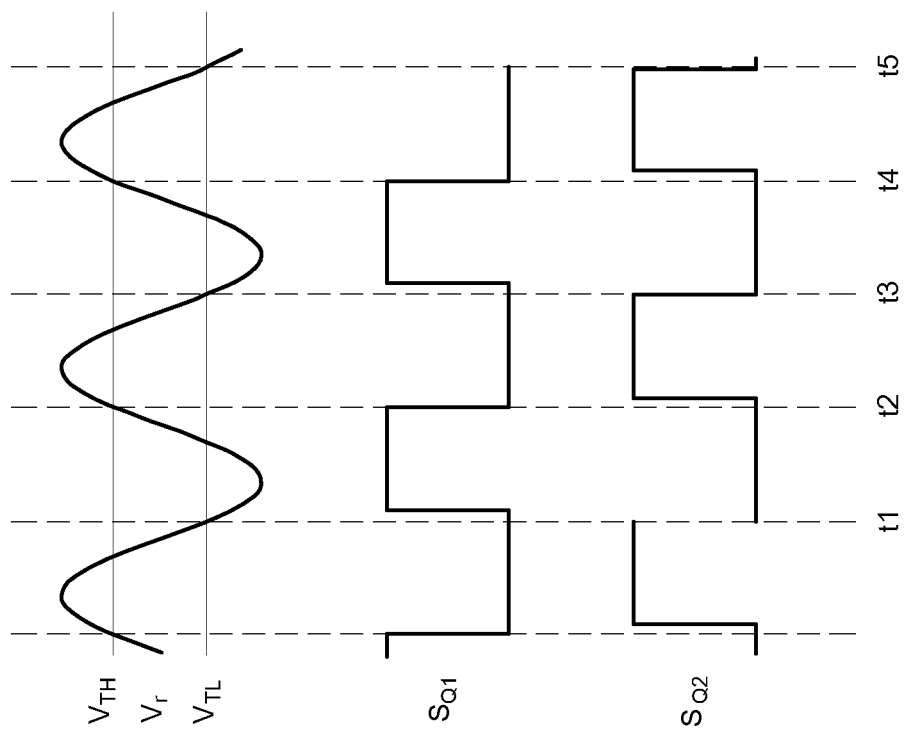
FIG. 3 is a schematic waveform of a dual-band charge control under a heavy-load condition or a general-load condition according to the present disclosure.

Reference will now be made to the drawing figures to describe the present disclosure in detail. It will be understood that the drawing figures and exemplified embodiments of present disclosure are not limited to the details thereof.

The main purpose of the present disclosure is that the known two-line charge control has the advantages of high frequency response and high- and low-frequency voltage gain, however, this control method has the problem of oscillation when the resonance circuit operates at light-load condition or no-load condition. Accordingly, based on the dual-band charge control method, the single-band charge control method is added to implement the dual-mode control method, thereby increasing the stability of the resonance circuit under the light-loading condition or the no-loading condition, and the single-band charge control and the dual-band charge control can be freely switched according to the load conditions.

Incidentally, the light-load condition (or no-load condition) or the heavy-load condition (or general-load condition) described in the present disclosure may be easily determined by those with ordinary knowledge in the technical field, so this definition will not cause misunderstanding or ambiguity unknown.

Reference will now be made to the drawing figures to describe the present disclosure in detail. It will be understood that the drawing figures and exemplified embodiments of present disclosure are not limited to the details thereof.

Figure 5:
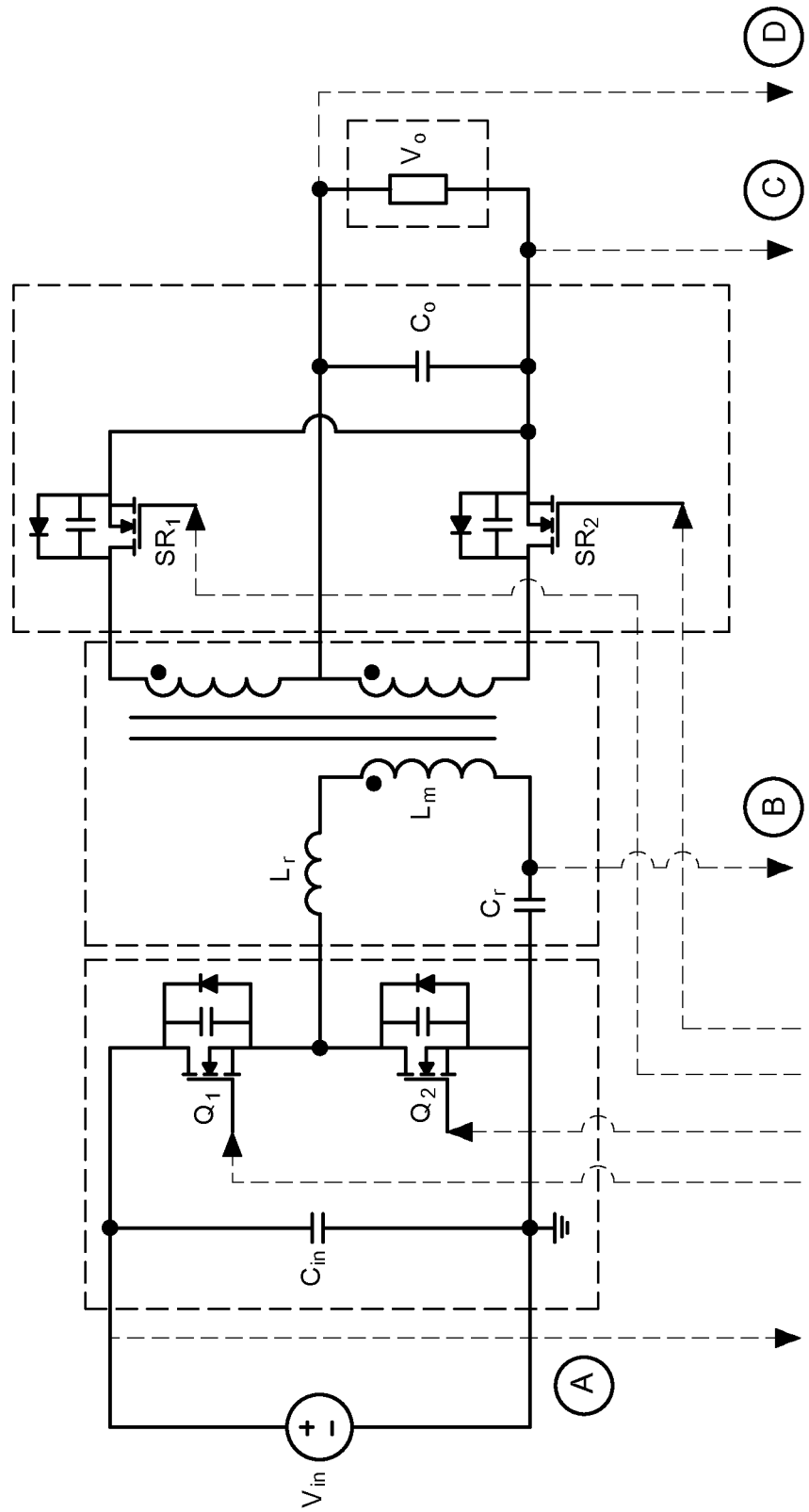
FIG. 5 is a circuit diagram of a converter with a resonance circuit according to the present disclosure.
Figure 6:
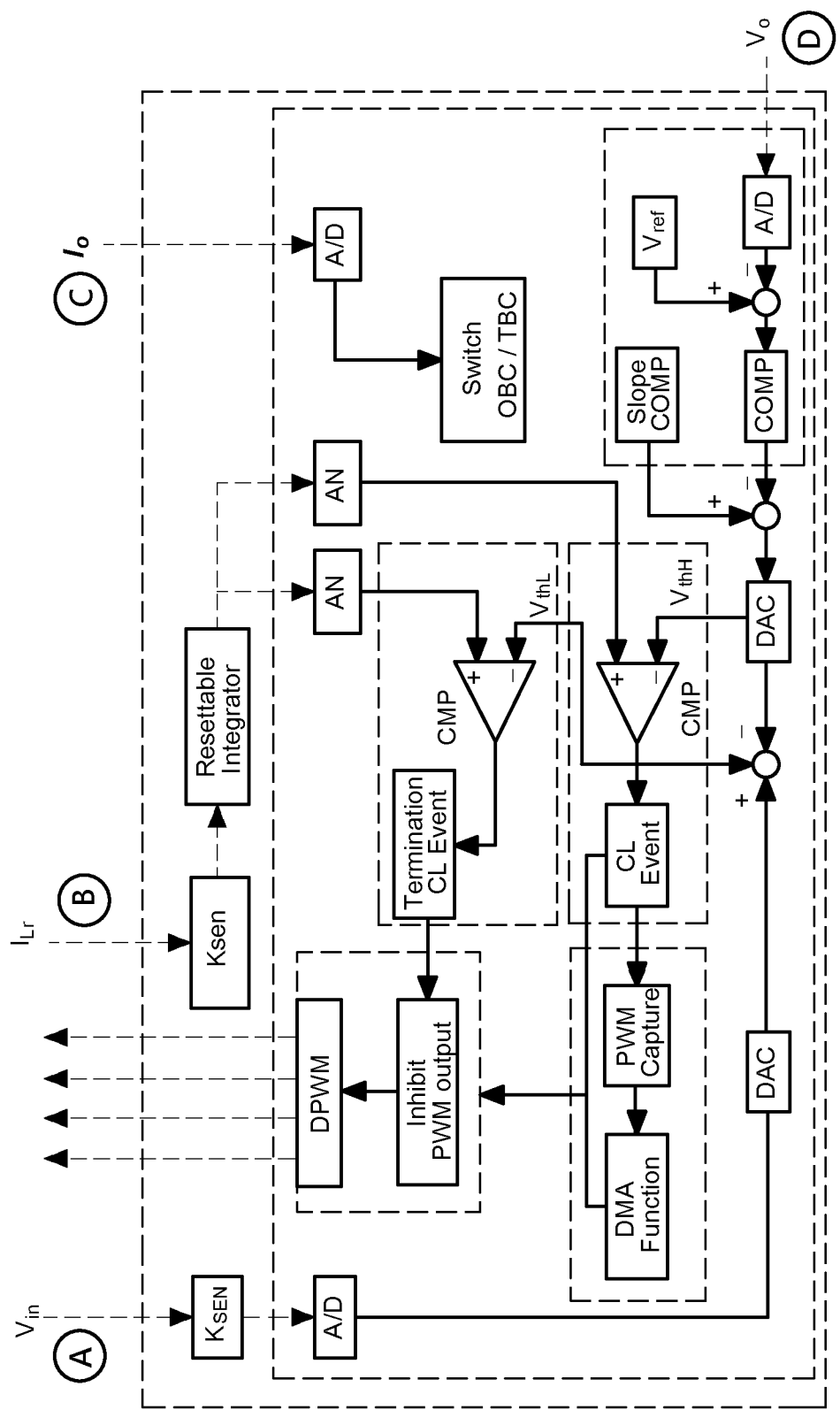
FIG. 6 is a block diagram of a control architecture of the converter with the resonance circuit according to the present disclosure.
Figure 7:
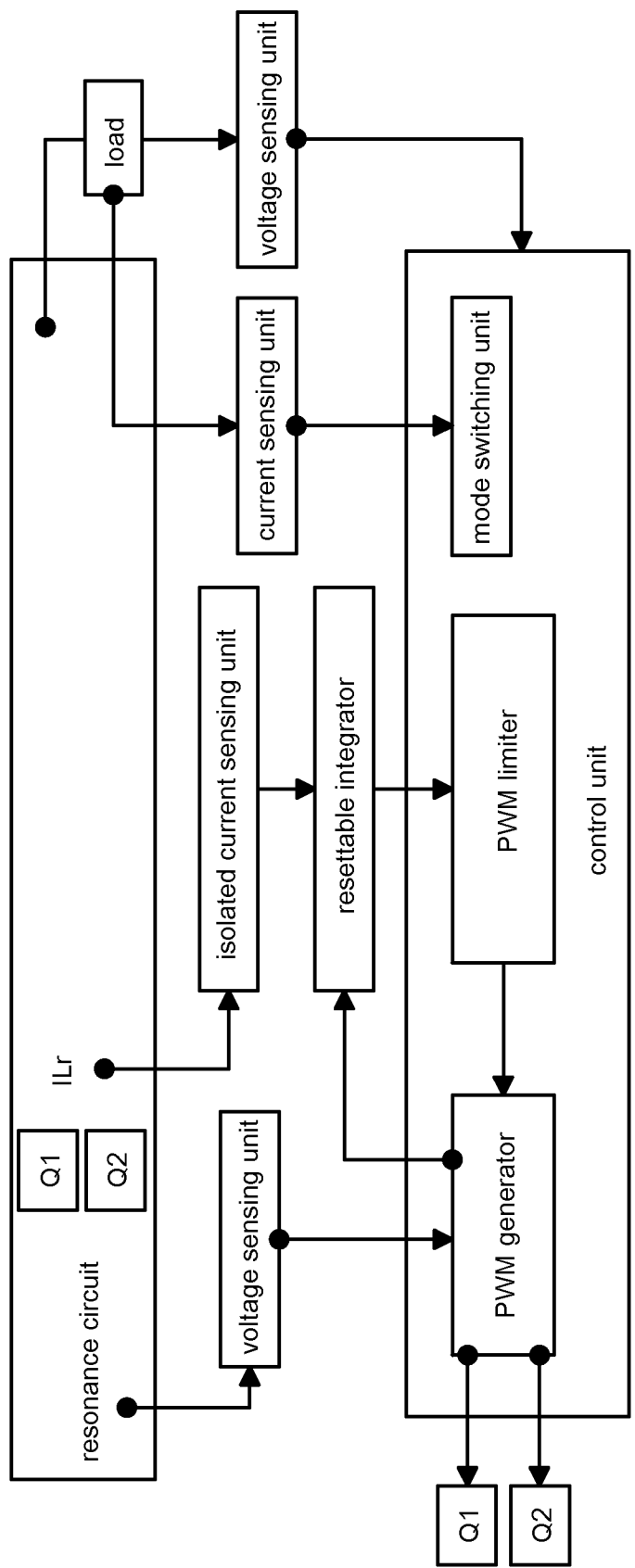
FIG. 7 is a schematic block diagram of operating the resonance circuit by a control unit according to the present disclosure.
Figure 8:
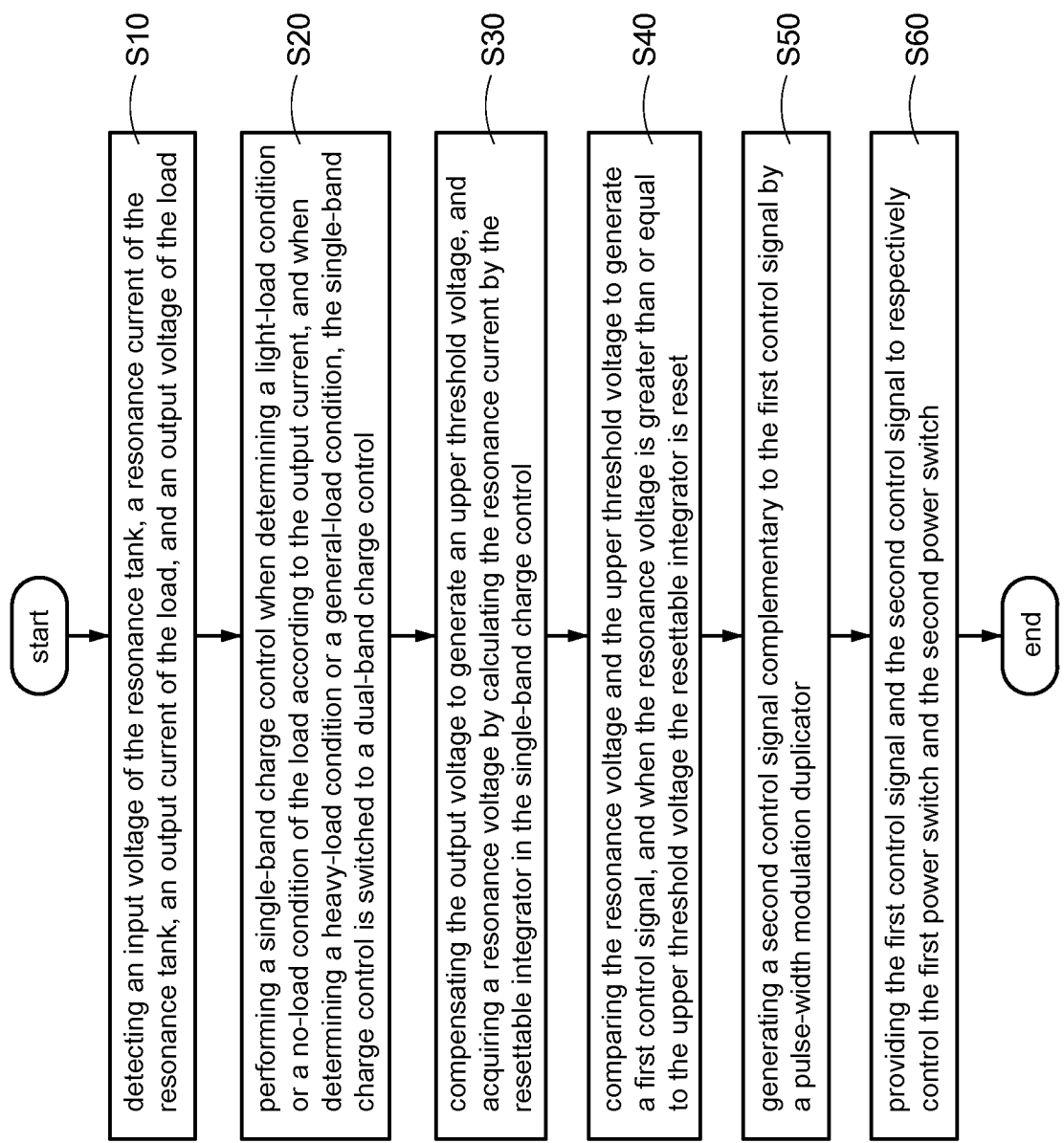
FIG. 8 is a flowchart of a single-band charge control of a dual mode charge control method according to the present disclosure.

Please refer to FIG. 8, which shows flowchart of a single-band charge control of a dual mode charge control method according to the present disclosure, refer to FIG. 5 and FIG. 6, which respectively show a circuit diagram and a block diagram of a converter with a resonance circuit according to the present disclosure, and refer to FIG. 7, which shows a schematic block diagram of operating the resonance circuit by a control unit according to the present disclosure. The method is used for controlling an output voltage of a load coupled to a circuit with a resonance tank. The converter with the resonance circuit receives the DC input voltage, controls the stable DC output voltage through the resonance circuit, the rectifier, and uses the charge control method to supply power to the load. As shown in FIG. 5, the resonance circuit includes an isolated transformer, and the resonance tank is composed of a resonance inductance Lr, a resonance capacitance Cr, and a magnetizing inductance Lm of the isolated transformer, and the resonance circuit is formed on the primary side of the isolated transformer.

A front stage of the resonance circuit is a conversion stage, and a rear stage of the resonance circuit is a rectification stage. The conversion stage is a conversion circuit, and includes a first power switch $Q_1$ and a second power switch $Q_2$ coupled in series. The resonance tank is coupled between a common-connected node of the first power switch $Q_1$ and the second power switch $Q_2$ and a grounding end. The rectification stage is a synchronous rectification circuit, and includes a first synchronous rectification switch $SR_1$ and a second synchronous rectification switch $SR_2$ coupled on the secondary side of the isolated transformer.

The output power control method of the converter with the resonance circuit includes steps of: first, detecting an input voltage Vin of the resonance tank, a resonance current Ir of the resonance tank, an output current Io of the load, and an output voltage Vo of the load (S10). The detection of the input voltage Vin of the resonance tank is shown by A in FIG. 5; the detection of the resonance current Ir of the resonance tank is shown by B in FIG. 5; the detection of the output current Io of the load is shown by C in FIG. 5; the detection of the output voltage Vo of the load is shown by D in FIG. 5. The input voltage Vin, the resonance current Ir, the output current Io, and the output voltage Vo are sensed/detected by sensing circuits. In particular, the resonance current is sensed/detected by an isolated current transformer (CT) connected to the resettable integrator in series. The isolation transformer is used as a current transformer to isolate the electrical circuit of the controller from the primary side of the resonance conversion circuit, which is beneficial to the integration of the electrical circuit of the controller and the rear-end circuits.

Afterward, performing a single-band charge control (right part shown in FIG. 2) when determining a light-load condition or a no-load condition of the load according to the output current Io, and when determining a heavy-load condition or a general-load condition according to the output current Io, the single-band charge control is switched to a dual-band charge control (S20). In other words, the results of seining the output current are used to determine that the load is a general condition (i.e., a non-light-load condition and a non-no-load condition) or the light-load condition or the no-load condition. After the determination of the load condition, the resonance circuit is controlled by switching mode to operate in the dual-band charge control or in the single-band charge control.

Figure 4:
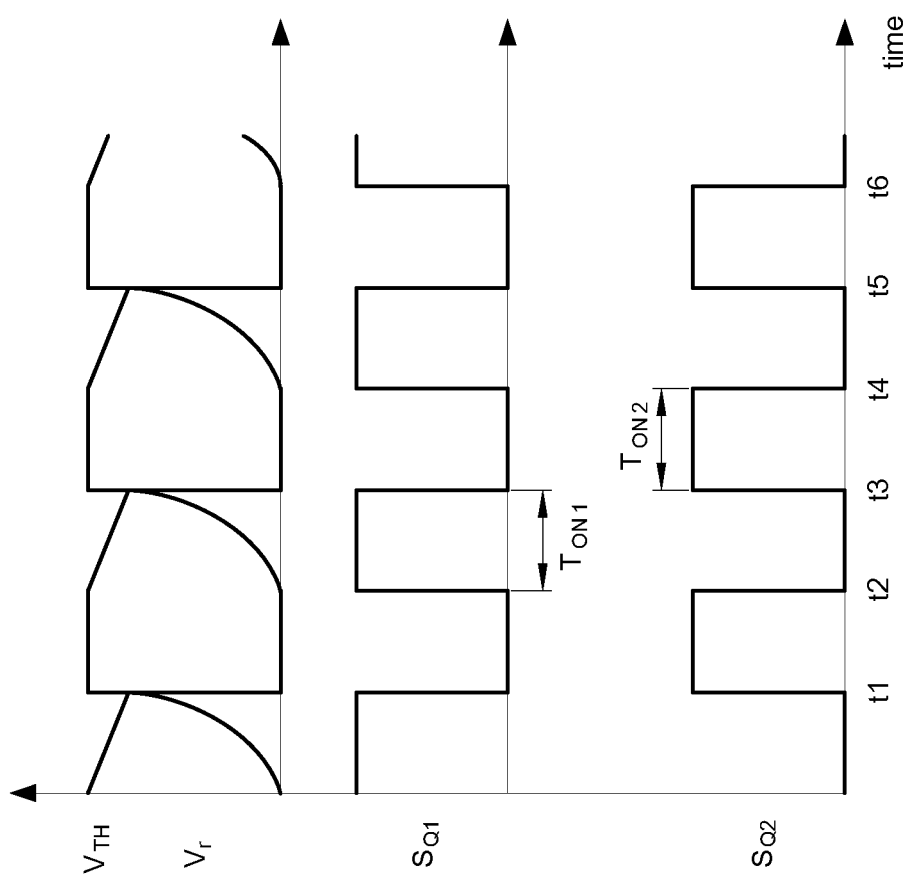
FIG. 4 is a schematic waveform of a single-band chare control under a light-load condition or a no-load condition according to the present disclosure.

Please refer to FIG. 4, which shows a schematic waveform of a single-band chare control under a light-load condition or a no-load condition according to the present disclosure. When the resonance circuit operates in the single-band charge control, i.e., when the light-load condition or the no-load condition of the load is determined in step (S20), compensating the output voltage Vo to generate an upper threshold voltage $V_{TH}$, and acquiring an isolated resonance voltage Vr by calculating the resonance current Ir by a resettable integrator (S30). Afterward, comparing the resonance voltage Vr and the upper threshold voltage $V_{TH}$ to generate a first control signal $S_{Q1}$, wherein when the resonance voltage Vr is greater than or equal to the upper threshold voltage $V_{TH}$, an on-time length of the first control signal $S_{Q1}$ is captured and the resettable integrator is reset (S40). That is, when the resonance circuit in the single-band charge control, a control signal is generated by a pulse-width modulation (PWM) generator to control the resettable integrator so as to reset the resettable integrator. Therefore, under the light-load condition or the no-load condition, when the resonance voltage Vr reaches the upper threshold voltage $V_{TH}$, the resettable integrator is reset by the PWM generator.

Accordingly, the dual mode charge control method of the present disclosure does not need to use a mono-stable flip-flop, and can avoid the output signal error caused by the upper threshold voltage $V_{TH}$ flipping to a low-level threshold voltage under the light-load condition or the no-load condition. Furthermore, it can avoid a signal divergence of the resonance voltage Vr during the single-band charge control, resulting in abnormal control signals of the first power switch $Q_1$ and the second power switch $Q_1$.

Afterward, generating a second control signal $S_{Q2}$ complementary to the first control signal $S_{Q1}$ by a pulse-width modulation duplicator according to the on-time length of the first control signal $S_{Q1}$ (S50). Finally, providing the first control signal $S_{Q1}$ and the second control signal $S_{Q2}$ to respectively control the first power switch $Q_1$ and the second power switch $Q_2$ of the resonance circuit (S60). Therefore, in the same cycle, an on-time length of the first power switch is the same as an on-time length of the second power switch; an off-time length of the first power switch is the same as an off-time length of the second power switch.

Specifically, under the light-load condition or the no-load condition, the resonance circuit operates in the single-band charge control. The detected/sensed output voltage Vo is compensated by voltage and slope to generate the upper threshold voltage $V_{TH}$. After comparing with the result of sensing the resonance current circuit, that is, the resonance current Ir is calculated by the resettable integrator to acquire the resonance voltage Vr so that the resonance voltage Vr is compared with the upper threshold voltage $V_{TH}$. According to the comparison result, a first control signal $S_{Q1}$ is generated, which is a pulse-width modulation (PWM) control command to control the first power switch Q1 (i.e., the upper arm switch). Afterward, the PWM control signal (first control signal $S_{Q1}$) is passed through the pulse-width modulation duplicator to generate a complementary PWM control signal (second control signal $S_{Q2}$) to control the second power switch Q2 (i.e., the lower arm switch), thereby achieving high frequency response and increasing low frequency voltage gain.

As shown in FIG. 6 and FIG. 7, the single-band charge control is performed under the light-load condition. The upper threshold voltage $V_{TH}$ is acquired by the output voltage Vo through a compensation. The resonance voltage Vr is acquired by the resonance current Ir through Ksen and the resettable integrator. The control signal $S_{Q1}$ of controlling the first power switch Q1 is acquired by comparing the resonance voltage Vr with the upper threshold voltage $V_{TH}$ through a first comparator and a PWM limiter, and then through a PWM generator. The control signal $S_{Q2}$ of controlling the second power switch $Q_2$ is acquired by comparing the resonance voltage Vr with the upper threshold voltage $V_{TH}$ through the first comparator and the PWM limiter, and by generating a complementary signal through a pulse-width modulation duplicator, and then through the PWM generator.

For synchronous rectification control, control signals of controlling the resonance bridge arm switches (i.e., the first power switch Q1 and the second power switch Q2) and a signal related to a resonance frequency of the resonance tank perform a union operation to control the bridge arm switches of the rectifier. That is, the control signals of controlling the resonance bridge arm switches (i.e., the first power switch Q1 and the second power switch Q2) are compensated by the resonance frequency of the resonance tank, thus increasing conversion efficiency of the converter through the use of synchronous rectification.

Figure 9:
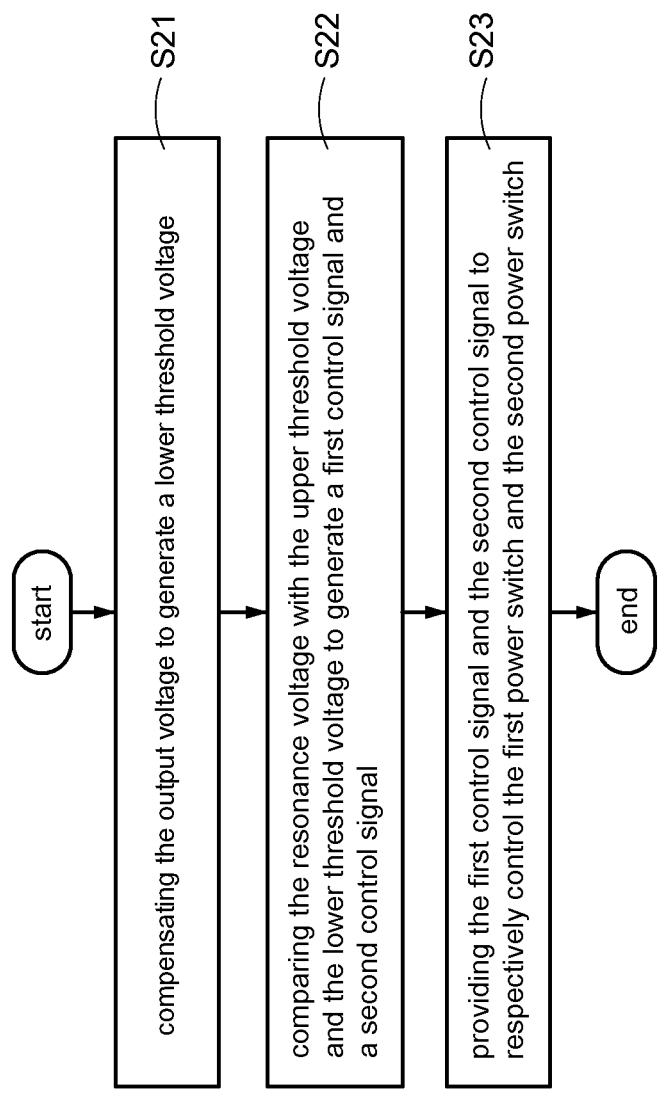
FIG. 9 is a flowchart of a dual-band charge control of the dual mode charge control method according to the present disclosure.

In comparison with the light-load condition or the no-load condition, the dual-band charge control is performed under the heavy-load condition or the general-load condition as shown in FIG. 3, which shows a schematic waveform of a dual-band charge control under a heavy-load condition or a general-load condition according to the present disclosure. Please refer to FIG. 9, which shows a flowchart of a dual-band charge control of the dual mode charge control method according to the present disclosure. The method of the dual-band charge control includes steps of: first, compensating an output voltage Vo by voltage and slope to generate an upper threshold voltage $V_{TH}$, and subtracting results of compensating the output voltage from an input voltage Vin sensed to generate a lower threshold voltage $V_{TL}$ (S21). Afterward, comparing the above-mentioned two limit lines with results of sensing the resonance current circuit in isolation (i.e., the resonance voltage Vr) to generate a first control signal $S_{Q1}$ and a second control signal $S_{Q2}$ (S22). Finally, providing the first control signal $S_{Q1}$ and the second control signal $S_{Q2}$ to respectively control a first power switch $Q_1$ and a second power switch Q2 of the resonance circuit (S23).

No matter under the general-loading condition, or the light-loading condition, and the no-load condition, the PWM control command must be sent to the PWM module to generate pulse control signals of controlling the first power switch Q1, the second power switch Q2, the first synchronous rectification switch $SR_1$, and the second synchronous rectification switch $SR_2$.

In summary, the present disclosure has the following features and advantages:
1. Based on the dual-band charge control method, a single-band charge control method is added to implement the dual-mode control method, thereby increasing the stability of the resonance circuit under the light-loading condition or the no-loading condition.
2. According to the load conditions, the single-band charge control and the dual-band charge control can be freely switched.
3. It maintains the characteristics of fast frequency response of dual-band charge control, and increases the stability and control resolution of the control method under light-loading condition.
4. The resonance circuit includes an isolation transformer, and the resonance tank is composed of a resonance inductance, a resonance capacitor, and a magnetizing inductance of the isolation transformer, and is formed on the primary side of the isolation transformer. The isolation transformer is used as a current transformer to isolate the electrical circuit of the controller from the primary side of the resonance conversion circuit, which is beneficial to the integration of the electrical circuit of the controller and the rear-end circuits.
5. Abandon the mono-stable trigger in the BBCC control method increases the control stability.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A dual mode charge control method, configured for controlling an output voltage of a load coupled to a circuit with a resonance tank, the method comprising steps of:
   detecting an input voltage of the resonance tank, a resonance current of the resonance tank, an output current of the load, and an output voltage of the load,
   performing a single-band charge control when determining a light-load condition or a no-load condition of the load according to the output current,
   compensating the output voltage to generate an upper threshold voltage in the single-band charge control, and acquiring a resonance voltage by calculating the resonance current by a resettable integrator,
   comparing the resonance voltage and the upper threshold voltage to generate a first control signal, wherein when the resonance voltage is greater than or equal to the upper threshold voltage, the resettable integrator is reset,
   generating a second control signal complementary to the first control signal by a pulse-width modulation duplicator, and
   providing the first control signal and the second control signal to respectively control a first power switch and a second power switch of the resonance circuit.

2. The dual mode charge control method as claimed in claim 1, wherein when determining a heavy-load condition or a general-load condition according to the output current, the single-band charge control is switched to a dual-band charge control.

3. The dual mode charge control method as claimed in claim 2, wherein in the dual-band charge control, further comprising steps of:
   compensating the input voltage to generate a lower threshold voltage by subtracting the upper threshold voltage from results of sensing the input voltage;
   comparing sensed resonance voltage in isolation with the upper threshold voltage and the lower threshold voltage to generate the first control signal and the second control signal, and
   providing the first control signal and the second control signal to respectively control the first power switch and the second power switch of the resonance circuit.

4. The dual mode charge control method as claimed in claim 1, wherein when the resonance voltage is increased to reach the upper threshold voltage, the resettable integrator is reset, and an on-time length of the first control signal is acquired.

5. The dual mode charge control method as claimed in claim 4, wherein the resettable integrator is reset by a control signal generated by a pulse-width modulation generator to zero an integral value the resonance current sensed in isolation.

6. The dual mode charge control method as claimed in claim 1, wherein the output voltage is compensated by voltage and slope.

7. The dual mode charge control method as claimed in claim 1, wherein the resonance current is sensed by an isolated current transformer connected to the resettable integrator in series.

8. The dual mode charge control method as claimed in claim 1, wherein in the same cycle, the on-time length of the first power switch is the same as an on-time length of the second power switch; an off-time length of the first power switch is the same as an off-time length of the second power switch.

9. The dual mode charge control method as claimed in claim 1, wherein control signals of controlling the first power switch and the second power switch and a signal related to a resonance frequency of the resonance tank perform a union operation to control bridge arm switches of synchronous rectification.

10. The dual mode charge control method as claimed in claim 1, wherein the resonance current is calculated by the resettable integrator and a current transformer connected in series to acquire the resonance voltage in isolation.

11. The dual mode charge control method as claimed in claim 1, wherein when the resonance voltage is greater than or equal to the upper threshold voltage, the resettable integrator is reset, and the on-time length of the first control signal is recorded.

* * * * *